US010844775B2

(12) United States Patent
Kelly et al.

(10) Patent No.: US 10,844,775 B2
(45) Date of Patent: Nov. 24, 2020

(54) METHOD AND SYSTEM FOR EMISSION CONTROL DEVICE HEATING

(71) Applicant: Ford Global Technologies, LLC, Dearborn, MI (US)

(72) Inventors: Tyler Kelly, Plymouth, MI (US); Douglas Martin, Canton, MI (US); Benjamin Rocci, Ann Arbor, MI (US); Vincent Martinez, Royal Oak, MI (US); Owen Bailey, Shelby Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/283,345

(22) Filed: Feb. 22, 2019

(65) Prior Publication Data
US 2020/0271046 A1 Aug. 27, 2020

(51) Int. Cl.
*F02B 37/10* (2006.01)
*F02D 41/00* (2006.01)
(Continued)

(52) U.S. Cl.
CPC ............ *F02B 37/10* (2013.01); *F01N 3/0236* (2013.01); *F01N 3/0293* (2013.01); *F01N 3/225* (2013.01); *F02B 37/183* (2013.01); *F02D 41/0007* (2013.01); *F02D 41/027* (2013.01); *F02D 41/029* (2013.01); *F02D 41/0255* (2013.01);
(Continued)

(58) Field of Classification Search
CPC ...... F02B 37/10; F02B 37/183; F02B 37/168; F02D 41/0007; F02D 41/0255; F02D 41/027; F02D 41/0275; F02D 41/029; F02D 2200/021; F02D 2200/0406; F02D 2200/0802; F01N 3/0236; F01N 3/0293; F01N 3/18; F01N 3/2006; F01N 3/22; F01N 3/225; F01N 2900/08
See application file for complete search history.

(56) References Cited

U.S. PATENT DOCUMENTS 5,544,483 A 8/1996 Heuer
8,359,839 B2 1/2013 Van Nieuwstadt et al.
(Continued)

FOREIGN PATENT DOCUMENTS

DE 10239110 A1 3/2004

OTHER PUBLICATIONS

Kelly, T. et al., "Method and System for Engine Control," U.S. Appl. No. 15/968,621, filed May 1, 2018, 54 pages.
(Continued)

*Primary Examiner* — Thai Ba Trieu
*Assistant Examiner* — Loren C Edwards
(74) *Attorney, Agent, or Firm* — Geoffrey Brumbaugh; McCoy Russell LLP

(57) ABSTRACT

Methods and systems are provided for expediting emission control device heating. In one example, a method may include flowing air from an intake of an engine to one or more emission control devices via an air injection system while operating a turbocharger via an electric motor to maintain a desired airflow to the engine in response to an emission control device heating condition. In this way, fresh air is provided to the one or more emission control devices without degrading engine performance or increasing engine speed.

17 Claims, 4 Drawing Sheets

(51) Int. Cl.
    *F02D 41/02*     (2006.01)
    *F01N 3/023*     (2006.01)
    *F01N 3/22*     (2006.01)
    *F02B 37/18*     (2006.01)
    *F01N 3/029*     (2006.01)

(52) U.S. Cl.
    CPC .... *F01N 2900/08* (2013.01); *F02D 2200/021* (2013.01); *F02D 2200/0406* (2013.01); *F02D 2200/0802* (2013.01)

(56) References Cited

U.S. PATENT DOCUMENTS

| | | |
|---|---|---|
| 2011/0072794 A1 | 3/2011 | Van Nieuwstadt et al. |
| 2011/0146274 A1* | 6/2011 | Shimizu ............ B01D 46/0005 60/611 |
| 2014/0060009 A1* | 3/2014 | Zhang ...................... F01N 3/18 60/274 |
| 2019/0032585 A1 | 1/2019 | Kelly et al. |

OTHER PUBLICATIONS

Kelly, T., "Method and System for Engine Control," U.S. Appl. No. 15/968,636, filed May 1, 2018, 50 pages.
Rollinger, J. et al., "Method and System for Particulate Filter Regeneration," U.S. Appl. No. 15/975,583, filed May 9, 2018, 53 pages.

\* cited by examiner

METHOD AND SYSTEM FOR EMISSION CONTROL DEVICE HEATING

FIELD

The present description relates generally to methods and systems for emission control device heating.

BACKGROUND/SUMMARY

Vehicles include emission control devices, such as three-way catalysts and particulate filters, to reduce emissions generated through combustion. For example, three-way catalysts may treat carbon monoxide, unburnt hydrocarbons, and nitrogen oxides, while particulate filters trap particulate matter flowing through the exhaust system. However, the effectiveness of such emission control devices varies with operating temperature. For example, a light-off temperature is used to signify a temperature above which a high exhaust treatment efficiency is achieved, enabling the emission control device to effectively decrease vehicle emissions. Therefore, during engine cold start conditions, various control strategies may be employed to expedite emission control device heating. As one example, spark timing may be retarded to increase exhaust heat, thereby increasing the emission control device temperature at a faster rate.

Further, if the particulate filter is not periodically cleaned or regenerated, the accumulated particulate matter cause an increase in the exhaust system backpressure which may further degrade engine performance. In order to periodically regenerate or purge the particulate filter, control strategies may be used to increase the exhaust gas temperature above a predetermined temperature (e.g., above 600° C.) to incinerate the carbon particles accumulated in the filter. In some examples, the particulate filter may reach a high enough exhaust temperature during normal vehicle operation to passively perform a regeneration. However, due to packaging constraints, particulate filters are often positioned in the exhaust system in locations that are slow to heat, and so it may take longer than desired for the particulate filter to reach temperatures that allow regeneration.

One example approach for expediting emission control device heating is shown by Van Nieuwstadt et al. in U.S. Pat. No. 8,359,839 B2. Therein, intake air may be pumped via a turbocharger compressor from an intake system of the engine to an exhaust system of the engine at a location upstream of a particulate filter and downstream of a three-way catalyst. Further, spark timing is retarded while air flow through the engine is increased to meet driver demand while providing additional heat to the exhaust (and thus the particulate filter). By introducing the intake air, the oxidation rate of soot in the particulate filter may be increased for particulate filter regeneration.

However, the inventors herein have recognized potential issues with such systems. As one example, emission control device heating for particulate filter regeneration is addressed, but emission control device heating during a cold start is not. Although supplying intake air downstream of the three-way catalyst reduces disruption of the three-way catalyst chemistry during particulate filter regeneration, it may be desirable to supply intake air upstream of the three-way catalyst to generate an exotherm for expediting three-way catalyst heating during a cold start. Further, the retarded spark timing may degrade engine performance and efficiency and is limited by combustion stability.

In one example, the issues described above may be addressed by a method comprising: responsive to a heating condition, flowing air from an intake of an engine to one or more emission control devices via an air injection system while operating a turbocharger via an electric motor to maintain a demanded airflow to the engine for producing engine torque. In this way, the one or more emission control devices may both receive intake air for expedited heating while operating the turbocharger via the electric motor reduces engine performance degradation.

As one example, the one or more emission control devices may include a three-way catalyst and a gasoline particulate filter coupled in an exhaust passage, the three-way catalyst coupled upstream of the gasoline particulate filter, and the air injection system may couple the intake to the exhaust passage at a first location upstream of the three-way catalyst and at a second location upstream of the gasoline particulate filter (and downstream of the three-way catalyst). The air injection system may include a first flow control valve positioned to enable or block flow from the intake to the air injection system, a second flow control valve positioned to enable or block flow from the air injection system to the exhaust passage at the first location, and a third flow control valve positioned to enable or block flow from the air injection system to the exhaust passage at the second location. Therefore, as an example, flowing air from the intake of the engine to the one or more emission control devices via the air injection system may include opening the first flow control valve to enable air to flow from the intake to the air injection system, opening the second flow control valve to enable air to flow from the air injection system to upstream of the three-way catalyst, and opening the third flow control valve to flow air from the air injection system to upstream of the gasoline particulate filter. As another example, flowing air from the intake of the engine to the one or more emission control devices via the air injection system may include opening the first flow control valve to enable air to flow from the intake to the air injection system and opening one of the second flow control valve and the third flow control valve to selectively flow air from the air injection system to upstream of the three-way catalyst or the gasoline particulate filter. Additionally, engine fueling may be enriched so that unburned fuel mixes with the air from the air injection system upstream of the three-way catalyst or the gasoline particulate filter to generate an exotherm.

Further, the air injection system may include an air accumulator positioned downstream of the first flow control valve and upstream of the second and third flow control valves, the air accumulator configured to store air for delivery to the exhaust passage. Further still, operating the turbocharger to maintain the desired airflow to the engine may include fully opening a turbocharger wastegate while spinning the turbocharger via the electric motor. In this way, fresh intake air may be provided to the three-way catalyst, the gasoline particulate filter, or both depending on a heating demand, enabling efficient heating both during a cold start and for particulate filter regeneration. Further, by bypassing a turbine of the turbocharger via the open wastegate, more heat may be delivered to the three-way catalyst and the particulate filter while engine performance and efficiency may be maintained by providing boost via the electric motor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
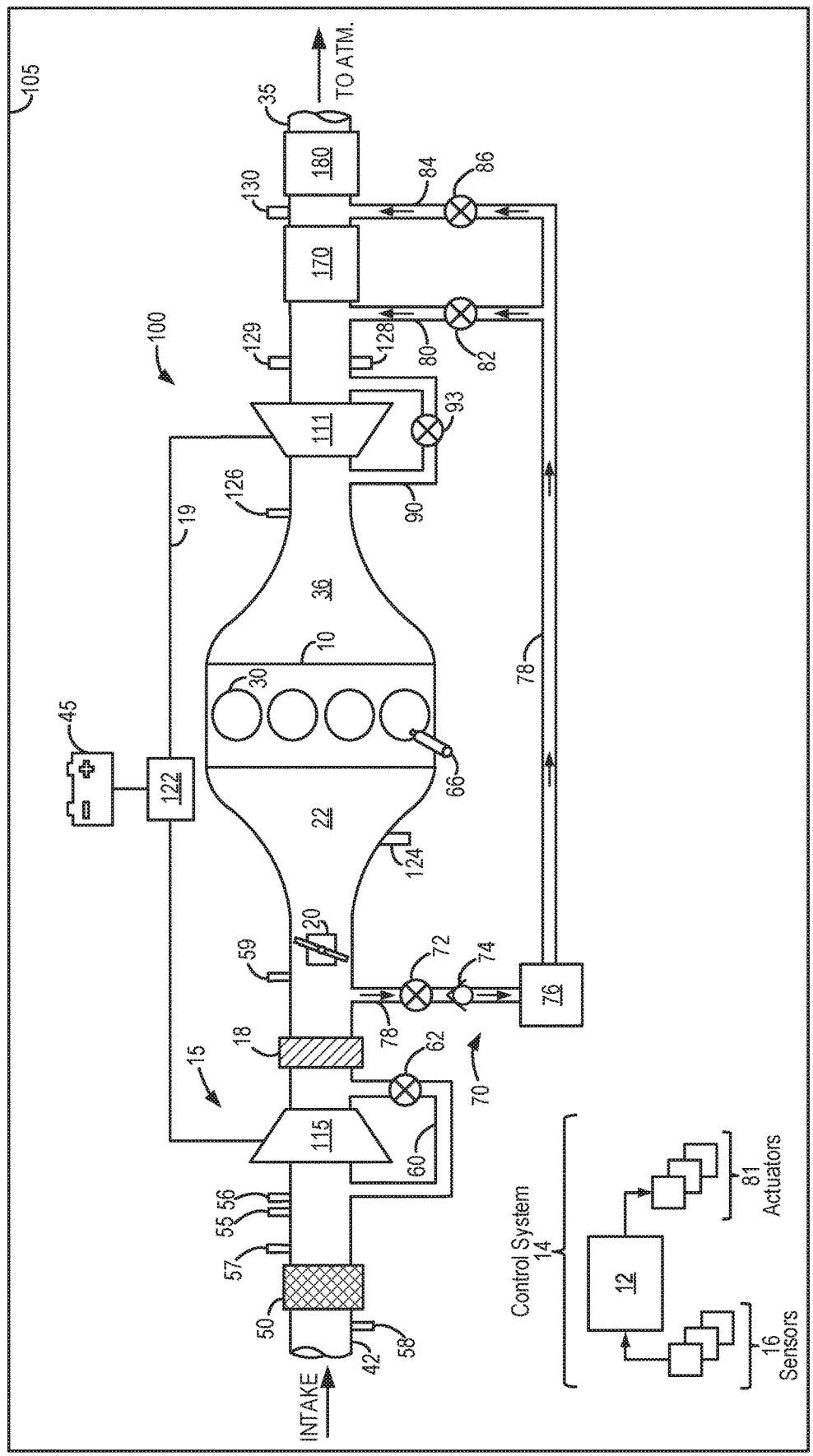
FIG. 1 shows a schematic depiction of a turbocharged engine system.
Figure 2:
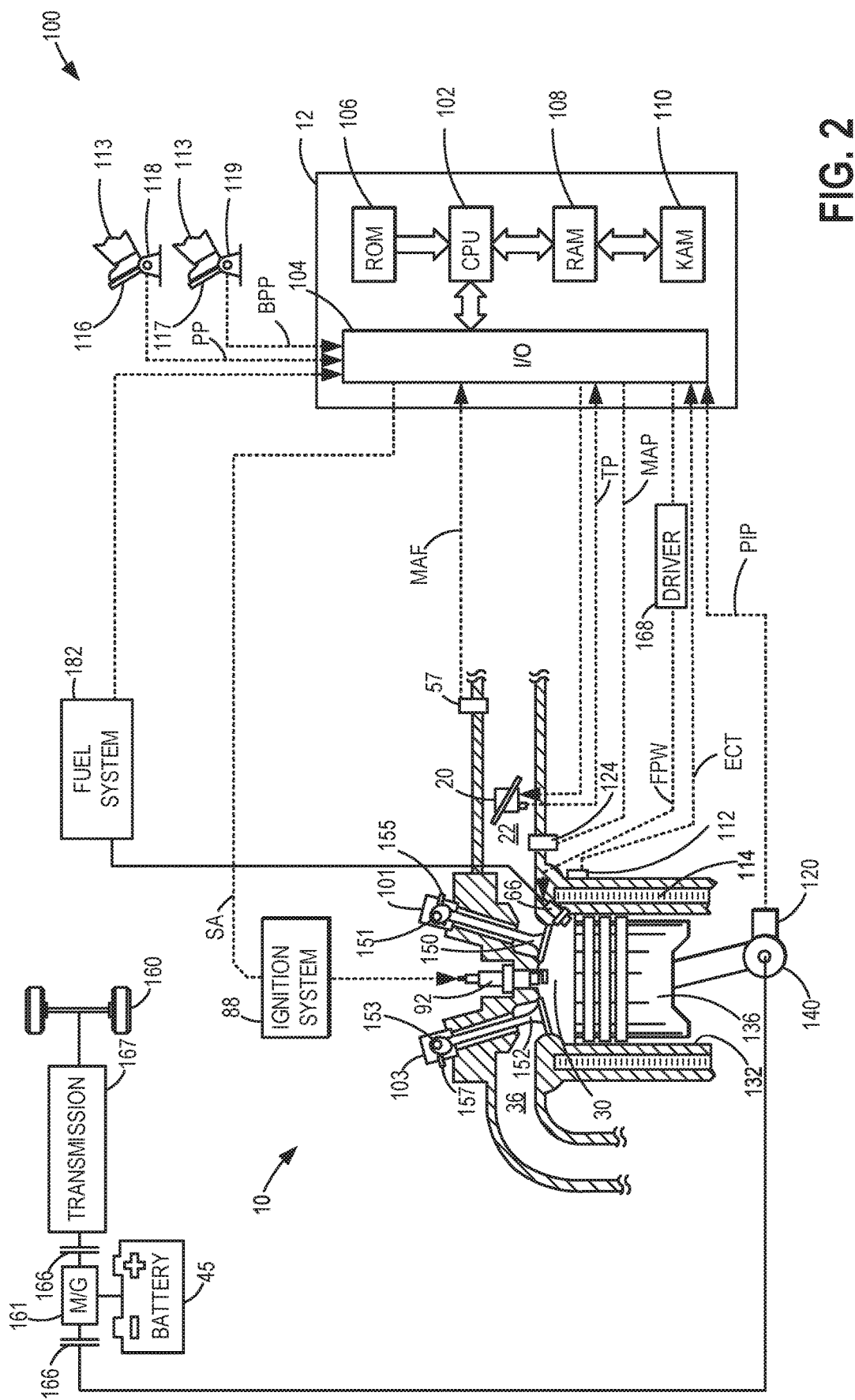
FIG. 2 shows an example of a cylinder of the engine system of FIG. 1.
Figure 3:
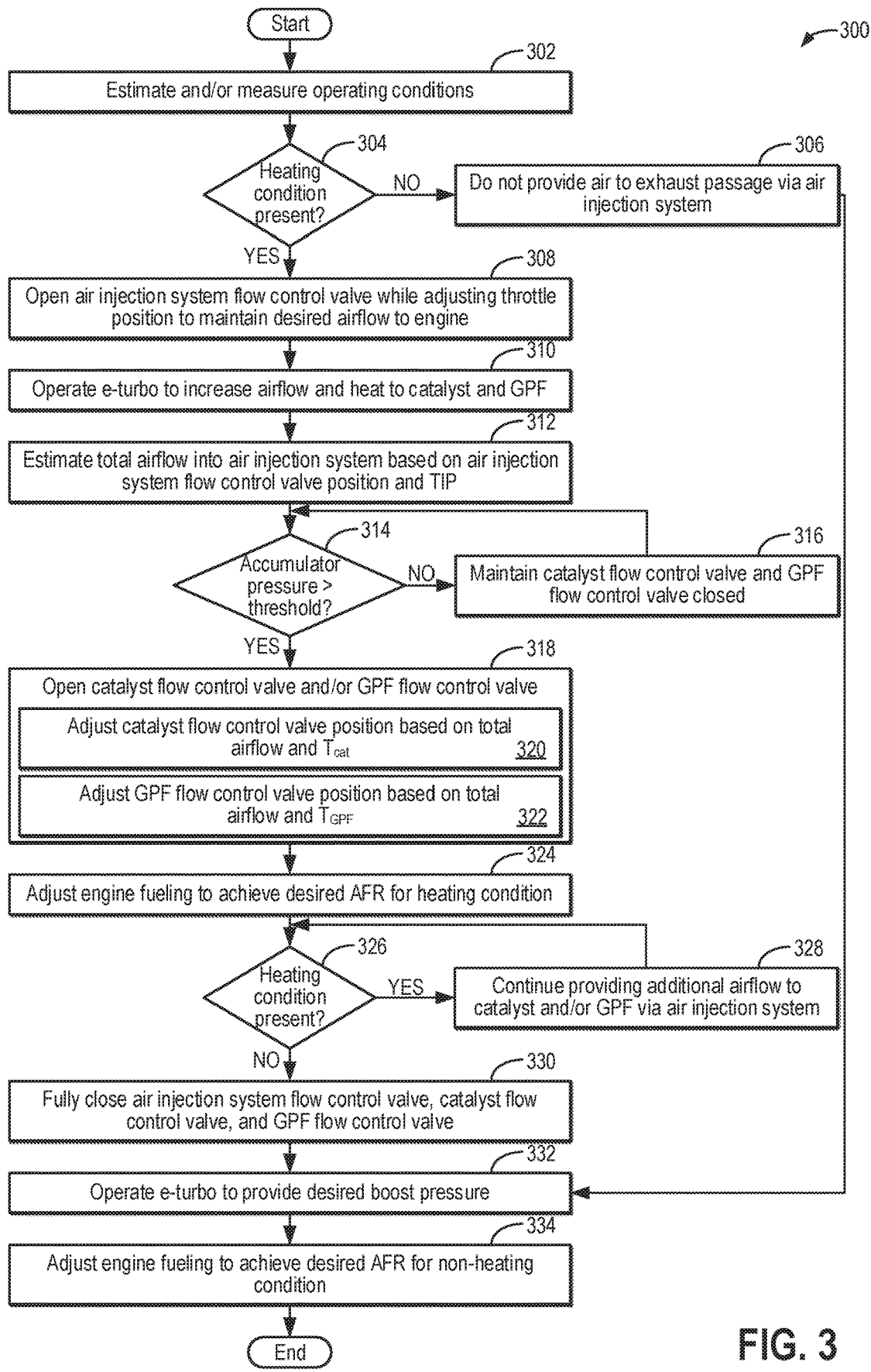
FIG. 3 is a flow chart of an example method for heating one or more emission control devices via a secondary air injection system.
Figure 4:
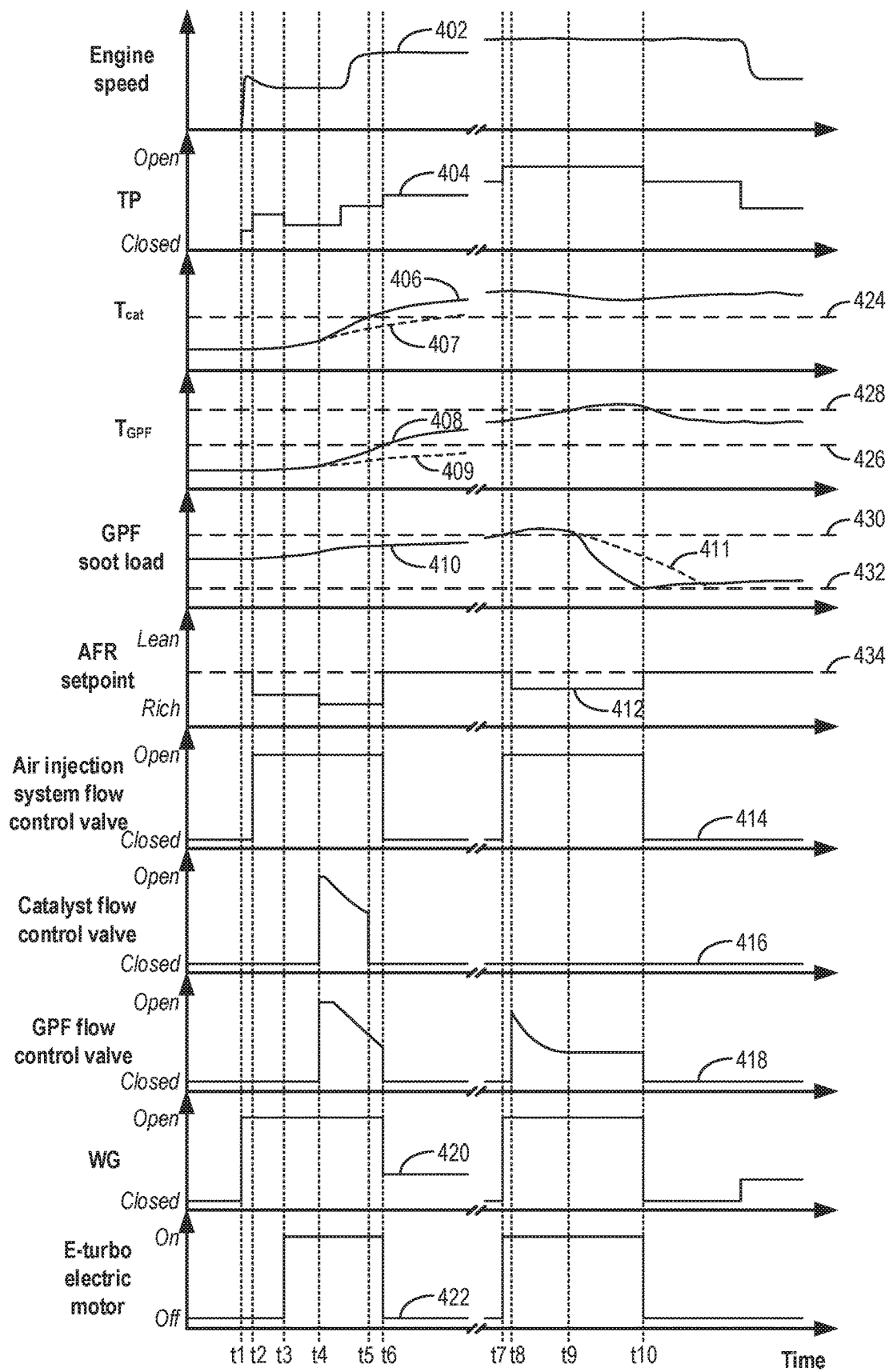
FIG. 4 shows a prophetic example timeline of emission control device heating for warm-up and regeneration.

The following description relates to systems and methods for expediting heating of one or more emission control devices coupled in a turbocharged engine system configured with electrical assistance, such as the engine system of FIGS. 1-2. The engine system further includes a secondary air injection system for selectively diverting a portion of an intake airflow from an intake of the engine to the one or more emission control devices, the secondary air injection system including an air accumulator and a plurality of valves for controlling the airflow. An engine controller may be configured to perform a control routine, such as the example routine of FIG. 3, to quickly heat the one or more emission control devices to a desired operating temperature, which may be a desired operating temperature for controlling emissions (e.g., a light-off temperature) or a desired operating temperature for regeneration. A prophetic example timeline of coordinating electrically assisted turbocharger operation with air injection system valve actuation to achieve emission control device heating is shown in FIG. 4.

FIG. 1 schematically shows aspects of an example engine system 100, including an engine 10 coupled in a vehicle 105. In some examples, vehicle 105 may be a hybrid vehicle with multiple sources of torque available to one or more vehicle wheels, as will be described below with respect to FIG. 2. In other examples, vehicle 105 is a conventional vehicle with only an engine. In the depicted example, engine 10 is a boosted engine including a turbocharger 15. Turbocharger 15 includes a compressor 115 driven by a turbine 111. Specifically, fresh air is introduced along an intake passage 42 and flows to compressor 115 via an air filter 50. Compressor 115 is shown mechanically coupled to turbine 111 via a shaft 19, and turbine 111 is driven by expanding engine exhaust. In one example, turbine 111 may be a twin scroll turbine. In another example, turbine 111 may be a variable geometry turbine (VGT), where turbine geometry is actively varied as a function of engine speed and other operating conditions.

In the depicted example, turbocharger 15 is an electrically assisted turbocharger ("e-turbo") further including an electric motor 122 for providing electric assistance to the turbocharger output. In one example, the electric motor is coupled to shaft 19, as shown. However in other examples, the electric motor may be coupled to the compressor or to the turbine. By adjusting an output of the electric motor 122, an amount of compressed air delivered by the compressor may be increased or decreased, as described below. Electric motor 122 may be powered by an on-board energy storage device, such as system battery 45. Electric motor 122 may be additionally or alternatively powered by an alternator. An amount of electrical power delivered to electric motor 122 may be varied in order to adjust an output of turbocharger 15. In one example, the amount of electric power delivered to electric motor 122 may be increased to increase the speed of compressor 115. As a result of the electric assistance, turbocharger 15 may be rapidly spun up, providing for a fast-acting or high frequency boost actuation.

Further, electric motor 122 may be configured as a motor-generator. Thus, during conditions when electric assistance is indicated for boost, electric motor 122 may provide positive torque to the turbocharger shaft 19 to increase the speed of turbocharger 15, and during conditions where electric assistance is indicated for braking, electric motor 122 may provide negative torque to the turbocharger shaft 19 to decrease the speed of turbocharger 15. Further, while providing negative torque, kinetic energy from turbocharger 15 may be converted to electrical energy by electric motor 122, and the generated electrical energy may be stored at system battery 45. A controller 12 may control a timing and amount of positive torque and negative torque applied from electric motor 122 to turbocharger 15 to regulate boost pressure.

During selected conditions, as elaborated below, air compressed by turbocharger 15 may be recirculated from an outlet to an inlet of compressor 115 through a compressor bypass passage 60 by adjusting an opening of a compressor recirculation valve (CRV) 62. CRV 62 may be a continuously variable valve, and increasing the opening of the CRV 62 may include actuating (or energizing) a solenoid of the valve. For example, a position of CRV 62 may be continuously variable from a fully closed position to a fully open position. In some examples, CRV 62 may be partially open during boosted engine operation to provide a surge margin. Herein, the partially open position may be a default valve position. Then, in response to an indication of surge, the opening of CRV 62 may be increased. For example, CRV 62 may be adjusted from the default, partially open position toward a fully open position, with a degree of opening based on the indication of surge (e.g., a compressor pressure ratio, a compressor flow rate, a pressure differential across the compressor, etc.). In alternate examples, CRV 62 may be held closed during boosted engine operation (e.g., peak performance conditions) to decrease boost response time and increase peak performance.

Compressor 115 is coupled to a throttle valve 20 through a charge-air cooler (CAC) 18 (also referred to as an intercooler). Air flows from compressor 115 through CAC 18 and throttle valve 20 to an intake manifold 22. CAC 18 may be an air-to-air or water-to-air heat exchanger, for example. Intake manifold pressure (e.g., a pressure of the air charge within the intake manifold) may be determined using a manifold absolute pressure (MAP) sensor 124.

Intake manifold 22 is coupled to a series of combustion chambers 30 through a series of intake valves (described below with respect to FIG. 2). The combustion chambers are further coupled to an exhaust manifold 36 via a series of exhaust valves (described below with respect to FIG. 2). In the depicted example, a single exhaust manifold 36 is shown. However, in other examples, the exhaust manifold may include a plurality of exhaust manifold sections. Configurations having a plurality of exhaust manifold sections may enable effluent from different combustion chambers to be directed to different locations in the engine system.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 1, each combustion chamber includes a fuel injector coupled thereto). Fuel may be delivered to fuel injector 66 by a fuel system (not shown in FIG. 1) including a fuel tank, a fuel pump, and a fuel rail. In the combustion chambers, combustion may be initiated via spark ignition and/or compression ignition.

As shown in FIG. 1, exhaust from exhaust manifold 36 is directed to turbine 111 to drive the turbine. When reduced turbine torque is desired, a portion of the exhaust may be directed instead through a wastegate 90, bypassing the turbine. A wastegate actuator 93 (e.g., wastegate valve) may be actuated open to relieve at least some exhaust pressure from upstream of turbine 111 to a location downstream of turbine 111 via wastegate 90. By reducing exhaust pressure upstream of turbine 111, turbine speed may be reduced.

During an operator tip-in event, when going from engine operation without boost to engine operation with boost responsive to an increase in operator torque demand, turbo lag can occur. This is due to delays in turbine 111 spin-up due to the turbocharger being a slower-acting compression device, and momentary reduction in flow through compressor 115 when throttle valve 20 opens at the tip-in. The same may also occur when the engine is operating boosted and there is a transient increase in boost demand due to an increase in accelerator pedal application by a vehicle operator. To reduce this turbo lag, during those selected conditions, electric motor 122 may be operated to increase the transient boost response. Specifically, responsive to the tip-in, wastegate actuator 93 may be closed (e.g., fully closed) to increase exhaust flow through turbine 111, and boost pressure can be transiently provided by drawing energy from system battery 45 to spin electric motor 122 and thereby accelerate shaft 19. In addition, CRV 62 may be closed (e.g., fully closed) so as to increase flow through compressor 115. When the turbine has sufficiently spun up and the turbocharger is capable of providing the requested amount of boost, electric motor 122 may be disabled (e.g., by discontinuing the supply of power to electric motor 122 from battery 45). Activation and deactivation of electric motor 122 may be precisely controlled via controller 12 in order to provide the desired boost pressure while reducing overshooting or undershooting of the desired boost pressure, minimizing boost pressure disturbances, and minimizing a duration of operation of electric motor 122, thereby minimizing an amount of electrical power consumed by electrically assisted turbocharger 15.

During an operator tip-out event, when going from engine operation with boost to engine operation without boost (or reduced boost), compressor surge may occur. This is due to a decreased flow through compressor 115 when throttle valve 20 closes at the tip-out. The reduced forward flow through the compressor can cause surge and degrade turbocharger performance. In addition, surge can lead to noise, vibration, and harshness (NVH) issues, such as undesirable noise from the engine intake system. To enable the torque demand to be rapidly reduced responsive to the tip-out without incurring compressor surge during a default mode of vehicle operation, at least a portion of the air charge compressed by compressor 115 may be recirculated to the compressor inlet. This allows excess boost pressure to be substantially immediately relieved. In particular, CRV 62 may be opened to recirculate (warm) compressed air from the outlet of compressor 115, upstream of CAC 18, to the inlet of compressor 115. In some embodiments, the compressor recirculation system may additionally or alternatively include a recirculation passage for recirculating cooled compressed air from downstream of CAC 18 to the inlet of compressor 115. In addition, wastegate actuator 93 may be moved to a more open (e.g., fully open) position so that more of the exhaust flow travels to the tailpipe while bypassing the turbine, thereby expediting turbine spin-down, and electric motor 122 may be used in a regenerative mode to provide negative torque to shaft 19, further expediting turbine spin-down while recuperating energy.

The combined flow from turbine 111 and wastegate 90 flows through one or more emission control devices coupled in an exhaust passage 35. In general, the one or more emission control devices may include one or more exhaust after-treatment components configured to reduce an amount of one or more substances in the exhaust flow. For example, one exhaust after-treatment component may be configured to trap NOx from the exhaust flow when the exhaust flow is lean and to reduce the trapped NOx when the exhaust flow is rich. In other examples, an exhaust after-treatment component may be configured to disproportionate NOx or to selectively reduce NOx with the aid of a reducing agent. In the depicted example, engine system 100 includes a first emission control device 170 coupled upstream of a second emission control device 180. Specifically, first emission control device 170 includes a three-way catalyst (also referred to as a "catalyst" herein) configured to oxidize residual hydrocarbons and carbon monoxide while reducing NOx in the exhaust flow, and second emission control device 180 includes a gasoline particulate filter (GPF) configured to trap and oxidize particulate matter (e.g., soot). However, different exhaust after-treatment components having any such functionality may be arranged in wash coats or elsewhere, either separately or together, in one or both of first emission control device 170 and second emission control device 180. As one example, first emission control device 170 may include a diesel oxidation catalyst and second emission control device 180 may include a diesel particulate filter (DPF), such as when engine 10 is a diesel engine. All or part of the treated exhaust from second emission control device 180 may be released into the atmosphere via exhaust passage 35.

In examples where first emission control device 170 and/or second emission control device 180 include a particulate filter (e.g., a GPF or a DPF), a regeneration process may be performed to reduce a soot load retained in the particulate filter. Once soot accumulation has reached a predetermined level (or load), identified via a pressure drop across the particulate filter, for example, regeneration of the particulate filter may be initiated. In one example, the pressure drop across the particulate filter may be determined based on an output of an upstream pressure sensor relative to an output of a downstream pressure sensor. In alternate examples, soot accumulation may be modeled based on engine operating conditions including engine speed and load, such as by controller 12 referencing a look-up table or algorithm stored in memory. In addition, based on engine operating conditions such as periods of engine operation with fuel enrichment, cold starts, DFSO events, etc., the accumulated soot load may be estimated and tracked. Once the accumulated soot (or soot load) exceeds a threshold, a regeneration routine may be initiated, described further below with reference to FIG. 3.

Engine system 100 is shown including an air injection system 70. Air injection system 70 may be configured as a secondary air injection system for providing air to first emission control device 170 and/or second emission control device 180. As will be further described herein, particularly with regard to FIG. 3, air injection system 70 may be used to supply additional air flow for emission control device heating. Air injection system 70 includes a conduit 78 that branches from intake passage 42 downstream of CAC 18 and upstream of throttle valve 20. A first passage 80 couples conduit 78 to exhaust passage 35 upstream of first emission control device 170, and a second passage 84 couples conduit 78 to exhaust passage 35 upstream of second emission control device 180 and downstream of first emission control device 170. In some examples, air injection system 70 may include an air accumulator 76. Air accumulator 76 may be configured as a storage tank for providing on-demand pressurized air in air injection system 70. However, in other examples air accumulator 76 may be omitted. Including air accumulator 76 may enable air injection system 70 to supply air to first emission control device 170 and/or second emission control device 180 faster than when air accumulator 76 is not included. Further, air accumulator 76 may optionally include a pressure transducer configured to transmit a signal to controller 12 corresponding to a pressure of the air in air accumulator 76.

Air injection system 70 further includes a plurality of valves. An air injection system flow control valve 72 is positioned in conduit 78 upstream of air accumulator 76. For example, air injection system flow control valve 72 may be positioned at an inlet of air injection system 70 to block or enable air flow from intake passage 42 into conduit 78. Further, air injection system flow control valve 72 may be adjusted to control an air flow rate through conduit 78. As one example, air injection system flow control valve 72 may be an electronically actuated continuously variable valve. Controller 12 may actuate air injection system flow control valve 72 from a fully closed position to a fully open position or a plurality of positions therebetween in response to secondary air injection being desired at the one or more emission control devices. A check valve 74 is positioned in series with air injection system flow control valve 72, downstream of air injection system flow control valve 72 in conduit 78. Check valve 74 may be a one-way valve that allows gas (e.g., air) to flow into conduit 78 from intake passage 42, through (at least partially) open air injection system flow control valve 72, and to air accumulator 76 and prevents air from flowing from air accumulator 76 to intake passage 42. For example, check valve 74 may open automatically (e.g., without input or adjustment from the controller or operator) to flow the air toward air accumulator 76 and to first passage 80 and second passage 84 (e.g., in the direction of the arrows shown in air injection system 70) and close automatically to prevent gas (e.g., air, exhaust gas, or a mixture thereof) from flowing to intake passage 42 from air injection system 70.

Air injection system 70 further includes a first flow control valve 82 positioned in first passage 80 and a second flow control valve 86 positioned in second passage 84. First flow control valve 82, also referred to herein as a catalyst flow control valve, may be positioned to block or enable flow through first passage 80 to exhaust passage 35 at a location upstream of first emission control device 170 while second flow control valve 86, also referred to herein as a GPF flow control valve, may be positioned to block or enable flow through second passage 84 to exhaust passage 35 at a location downstream of first emission control device 170 and upstream of second emission control device 180. That is, first flow control valve 82 may be adjusted to control flow through a first outlet of air injection system 70 (e.g., where first passage 80 couples to exhaust passage 35), and second flow control valve 86 may be adjusted to control flow through a second outlet of air injection system 70 (e.g., where second passage 84 couples to exhaust passage 35). Thus, first flow control valve 82 and second flow control valve 86 are each coupled in series with air injection system flow control valve 72 and are coupled in parallel with each other. As used herein, "coupled in series" refers to components in a single flow path, whereas "coupled in parallel" refers to components in different, separate flow paths that branch from a common flow path. First flow control valve 82 and second flow control valve 86 each may be an electronically actuated, continuously variable valve that may be actuated to a plurality of positions between and including a fully open position and a fully closed position in response to a control signal from controller 12. For example, the controller may open air injection system flow control valve 72 (e.g., increase an amount of opening of air injection system flow control valve 72) to enable airflow through air injection system 70 and open first flow control valve 82 and second flow control valve 86 to positions corresponding to a desired amount of air delivery to first emission control device 170 and second emission control device 180, respectively, as will be further described below with respect to FIG. 3.

In examples where engine system 100 includes one or more additional emission control devices, air injection system 70 may include additional passages and flow control valves for selectively providing additional air flow to the additional emission control device(s). For example, in examples where engine system 100 includes a third emission control device coupled downstream of second emission control device 180, air injection system 70 may include a third passage that couples conduit 78 to exhaust passage 35 at a location downstream of second emission control device 180 and upstream of the third emission control device, with a third flow control valve positioned in the third passage. Similarly, in examples where engine system 100 includes only one emission control device (e.g., only first emission control device 170), second passage 84 and second flow control valve 86 may be omitted. Further still, in examples where more than one cylinder bank is present and each bank includes its own exhaust passage and emission control device(s), each bank may include its own set of passages and valves such that air flow to each bank may be controlled separately.

One or more sensors may be coupled in various locations throughout vehicle 105. For example, a temperature sensor 55 may be coupled to the inlet of compressor 115 for estimating a compressor inlet temperature. As another example, a pressure sensor 56 may be coupled to the inlet of compressor 115 for estimating a pressure of air entering the compressor. Still other sensors may include, for example, air-fuel ratio sensors, humidity sensors, etc. The sensors may estimate a condition of the intake air received at the compressor inlet from the intake passage as well as the air charge recirculated from upstream of CAC 18. One or more sensors may also be coupled to intake passage 42 upstream of air filter 50, such as a pressure sensor 58. For example, the pressure measured upstream of air filter 50 may be equal to barometric (e.g., atmospheric) pressure. In addition, a throttle inlet pressure (TIP) sensor 59 may be coupled downstream of CAC 18 and upstream of throttle valve 20 for estimating a boost pressure delivered to the engine.

Controller 12 may be included in a control system 14. Controller 12 is shown receiving information from a plurality of sensors 16 (various examples of which are described herein) and sending control signals to a plurality of actuators 81 (various examples of which are described herein). As one example, in addition to the sensors described above, sensors 16 may further include an exhaust gas sensor 126 located upstream of turbine 111, a first exhaust temperature sensor 128 coupled upstream of first emission control device 170 and downstream of turbine 111, an exhaust pressure sensor 129 coupled upstream of first emission control device 170 and downstream of turbine 111, a second exhaust temperature sensor 130 coupled between first emission control device 170 and second emission control device 180, and a mass air flow (MAF) sensor 57. Other sensors, such as additional pressure, temperature, air/fuel ratio, and composition sensors, may be coupled to various locations in engine system 100, examples of which will be described below with respect to FIG. 2. The actuators 81 may include, for example, throttle valve 20, CRV 62, electric motor 122, wastegate actuator 93, fuel injector 66, air injection system flow control valve 72, first flow control valve 82, and second flow control valve 86. Controller 12 may receive input data from the various sensors, process the input data, and employ the various actuators to adjust engine system operation based on the received signals and instructions stored on a memory of the controller. The controller may employ the actuators in response to the processed input data based on instruction or code programmed therein corresponding to one or more routines, such as an example control routine described herein with regard to FIG. 3. As an example, responsive to temperatures measured by first exhaust temperature sensor 128 and second exhaust temperature sensor 130 indicating an emission control device heating condition, the controller may actuate the various flow control valves of air injection system 70, adjust operation of electrically assisted turbocharger 15, and adjust throttle valve 20 to provide additional air and heat to first emission control device 170 and/or second emission control device 180 while maintaining a desired boost pressure.

Referring now to FIG. 2, a partial view of a single cylinder of internal combustion engine 10 is shown. As such, components previously introduced in FIG. 1 are represented with the same reference numbers and are not re-introduced. Engine 10 is depicted with combustion chamber (cylinder) 30, which may represent any of the cylinders shown in FIG. 1. Combustion chamber 30 includes a coolant sleeve 114 and cylinder walls 132, with a piston 136 positioned therein and connected to a crankshaft 140. Combustion chamber 30 is shown communicating with intake manifold 22 and exhaust manifold 36 via an intake valve 150 and an exhaust valve 152, respectively. In the depicted example, only one intake valve 150 and exhaust valve 152 are shown. However, in other examples, more than one intake valve and/or exhaust valve may be included, such as two intake valves and two exhaust valves.

Intake valve 150 and exhaust valve 152 are located at an upper region of combustion chamber 30. Intake valve 150 and exhaust valve 152 may be controlled by controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, each intake valve, including intake valve 150, is controlled by an intake cam 151, and each exhaust valve, including exhaust valve 152, is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate the exhaust valve 152 such that it remains closed and does not open at its set timing. The position of intake camshaft 151 and exhaust camshaft 153 may be determined by camshaft position sensors 155 and 157, respectively.

In some examples, intake valve 150 and/or exhaust valve 152 may be controlled by electric valve actuation instead of cam acutation. For example, cylinder 30 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system.

Cylinder 30 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 92 for initiating combustion. An ignition system 88 can provide an ignition spark to combustion chamber 30 via spark plug 92 in response to a spark advance signal SA from controller 12, under select operating modes. However, in some examples, spark plug 92 may be omitted, such as where engine 10 initiates combustion by autoignition or by injection of fuel, such as when engine 10 is a diesel engine.

As a non-limiting example, cylinder 30 is shown including one fuel injector 66. Fuel injector 66 is shown coupled directly to combustion chamber 30 for injecting fuel directly therein in proportion to a pulse width of a signal FPW received from controller 12 via an electronic driver 168. In this manner, fuel injector 66 provides what is known as direct injection (hereafter also referred to as "DI") of fuel into cylinder 30. While FIG. 2 shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to improve mixing. In another example, injector 66 may be a port injector providing fuel into the intake port upstream of cylinder 30.

Fuel may be delivered to fuel injector 66 from a high pressure fuel system 182 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 182 may hold fuel with different fuel qualities, such as different fuel compositions. These differences may include different alcohol content, different octane, different heats of vaporization, different fuel blends, and/or combinations thereof, etc. In some examples, fuel system 182 may be coupled to a fuel vapor recovery system including a canister for storing refueling and diurnal fuel vapors. The fuel vapors may be purged from the canister to the engine cylinders during engine operation when purge conditions are met.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 2 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including a measurement of inducted mass air flow (MAF) from mass air flow sensor 57, an engine coolant temperature signal (ECT) from a temperature sensor 112 coupled to coolant sleeve 114, a profile ignition pickup signal (PIP) from a Hall effect sensor 120 (or other type) coupled to crankshaft 140, a throttle position (TP) from a throttle position sensor coupled to throttle valve 20, and an absolute manifold pressure signal (MAP) from MAP sensor 124. An engine speed signal, RPM, may be generated by controller 12 from signal PIP. The manifold pressure signal MAP from the manifold pressure sensor may be used to provide an indication of vacuum or pressure (e.g., boost) in intake manifold 22.

In some examples, the vehicle may be a hybrid vehicle with multiple sources of torque available to one or more vehicle wheels 160. In other examples, the vehicle is a conventional vehicle with only an engine. In the example shown in FIG. 2, the vehicle includes engine 10 and an electric machine 161. Electric machine 161 may be a motor or a motor/generator and thus may also be referred to herein as an electric motor. Electric machine 161 receives electrical power from system battery 45 to provide torque to vehicle wheels 160. Electric machine 161 may also be operated as a generator to provide electrical power to charge system battery 45, for example, during a braking operation.

Crankshaft 140 of engine 10 and electric machine 161 are connected to vehicle wheels 160 via a transmission 167 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As described above, FIG. 2 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 30.

As mentioned above, reducing an amount of time before emission control devices reach their light-off temperatures is a primary challenge in reducing overall vehicle emissions. Further, opportunities for regenerating emission control devices may be limited due to the high temperatures needed and the slow to heat location of some emission control devices, such as particulate filters. Thus, FIG. 3 provides an example method 300 for expediting emission control device heating via a secondary air injection system (e.g., air injection system 70 shown in FIG. 1). For example, the air injection system may be operated to provide additional airflow to an exhaust passage of an engine upstream of the emission control device. In particular, method 300 will be described with respect to two emission control devices, a catalyst (e.g., first emission control device 170 of FIG. 1) and a GPF (e.g., second emission control device 180 of FIG. 1) coupled downstream of the catalyst. However, method 300 may be utilized to heat other emission control devices or other numbers of emission control devices (e.g., more or less than two) without departing from the scope of this disclosure.

Method 300 will be described for a boosted engine system that includes an electrically assisted turbocharger (e.g., turbocharger 15 shown in FIG. 1) that may be operated to increase airflow through the air injection system while maintaining a desired airflow to the engine. Additionally, method 300 will be described for an air injection system that includes an air accumulator (e.g., air accumulator 76 of FIG. 1). However, method 300 may be modified for engine systems that do not include an electrically assisted turbocharger and/or an air accumulator, as will be elaborated below. Instructions for carrying out method 300 and the rest of the methods included herein may be executed by a controller (e.g., controller 12 of FIGS. 1 and 2) based on instructions stored on a memory of the controller and in conjunction with signals received from sensors of the engine system, such as the sensors described above with reference to FIGS. 1 and 2. The controller may employ engine actuators of the engine system to adjust engine operation according to the methods described below.

At 302, method 300 includes estimating and/or measuring operating conditions. The operating conditions may include, for example, engine speed, engine load, manifold air pressure (MAP, such as measured by MAP sensor 124 of FIGS. 1 and 2), intake manifold temperature, mass air flow (MAF, such as measured by MAF sensor 57 of FIGS. 1 and 2), a throttle inlet pressure (e.g., as measured by pressure sensor 59 of FIG. 1), engine temperature (e.g., based on the signal ECT from temperature sensor 112 of FIG. 2), a temperature of the catalyst (e.g., based on an exhaust temperature measurement from first exhaust temperature sensor 128 of FIG. 1), a temperature of the GPF (e.g., based on an exhaust temperature measurement from second exhaust temperature sensor 130 of FIG. 1), a soot load of the GPF, an air pressure of the air accumulator, a driver torque demand (e.g., based on the signal PP from pedal position sensor 118 of FIG. 2), a desired boost pressure (e.g., to achieve the driver torque demand), an available boost pressure, an airflow to the engine, ambient conditions (e.g., ambient temperature, pressure, and humidity), etc. The airflow to the engine may be determined based on a plurality of engine operating parameters, such as engine speed, MAP, manifold temperature, engine displacement, and engine volumetric efficiency. For example, the controller may input the plurality of engine operating parameters into an equation and output the airflow to the engine. Further, the airflow may be divided by the number of engine cylinders to determine a cylinder air amount.

At 304, method 300 includes determining if an emission control device heating condition is present. As one example, the emission control device heating condition is present in response to a cold start condition. Thus, the emission control device heating condition may coincide with the cold start condition. As an example, the cold start condition may be confirmed when engine temperature is less than a first threshold temperature. The first threshold temperature may correspond to a non-zero, positive temperature value stored in a memory of the controller, above which the engine is considered to be warm and at a steady state operating temperature. As another example, the cold start condition may be confirmed when the engine temperature is substantially equal to the ambient temperature (e.g., within a threshold of the ambient temperature, such as within 10° C.) at engine start (e.g., when the engine cranked from zero speed to a non-zero speed, with fuel and spark provided to initiated combustion). As still another example, the cold start condition may be confirmed when the engine has been inactive for greater than a threshold duration, which may correspond to a non-zero amount of time (e.g., minutes, hours, or days) over which the engine is expected to cool to approximately ambient temperature.

As another example, the emission control device heating condition may be confirmed when one or both of the catalyst and the GPF are below their respective desired operating temperatures. As one example, the desired operating temperatures may be light-off temperatures of the catalyst and the GPF. The light-off temperature of the catalyst may be a predetermined, second threshold temperature stored in the memory of the controller at or above which a high catalytic efficiency is achieved, enabling the catalyst to effectively decrease vehicle emissions, for example. Similarly, the light-off temperature of the GPF may be a predetermined, third threshold temperature stored in the memory of the controller at or above which soot emission is efficiently decreased. The catalyst and/or the GPF may be below their respective light-off temperatures during the cold start condition, for example.

In a further example, the desired operating temperatures may be regeneration temperature thresholds of the catalyst and the GPF, and the emission control device heating condition may be further in response to a regeneration condition. As described above with respect to FIG. 1, the GPF regeneration condition, and thus the emission control device heating condition, may be confirmed in response to the soot load of the GPF being greater than a threshold soot load. The threshold soot load may be a predetermined, non-zero soot load stored in the memory of the controller at which the GPF is nearing capacity, for example, and/or at which an exhaust backpressure generated by the loaded filter may adversely affect engine performance. Thus, the emission control device heating condition may coincide with the regeneration condition. The regeneration temperature threshold of the catalyst may be a predetermined, non-zero fourth threshold temperature stored in the memory of the controller, greater than the second threshold temperature, at or above which catalyst regeneration occurs. For example, sulfur in the exhaust gas may reduce catalytic activity of the catalyst, and heating the catalyst above its regeneration temperature threshold may de-sulfur the catalyst to restore higher catalytic activity. Similarly, the regeneration temperature threshold of the GPF may be a predetermined, non-zero fifth threshold temperature stored in the memory of the controller, greater than the third threshold temperature, at or above which soot particles are burned from the GPF at a faster rate than new soot particles are deposited. As one non-limiting example, the regeneration temperature threshold of each of the catalyst and the GPF may be 600° C.

If the emission control device heating condition is not present, method 300 proceeds to 306 and includes not providing air to the exhaust passage via the air injection system. For example, an air injection system flow control valve (e.g., air injection system flow control valve 72 of FIG. 1), a catalyst flow control valve (e.g., first flow control valve 82 of FIG. 1), and a GPF flow control valve (e.g., second flow control valve 86 of FIG. 1) will all be maintained closed (e.g., in the fully closed position). The air injection system flow control valve may serve as a primary valve for enabling airflow from an intake passage of the engine into the air injection system, for example, whereas the catalyst flow control valve and the GPF flow control valve may be positioned to control flow from the air injection system to the catalyst and the GPF, respectively. With the air injection system flow control valve fully closed, air will not enter the air injection system from the intake passage. With the catalyst flow control valve and the GPF flow control valve fully closed, air will not exit the air injection to the exhaust passage. Method 300 may proceed from 306 to 332 to operate the electrically assisted turbocharger to provide the desired boost pressure, as will be described below.

If instead the emission control device heating condition is present at 304, method 300 proceeds to 308 and includes opening the air injection system flow control valve while adjusting a throttle position to maintain a desired airflow to the engine. For example, without compensation, opening the air injection system flow control valve reduces airflow to the engine that would be used for combustion, and the driver torque demand may not be met. Therefore, a throttle valve, located in the intake passage downstream of an inlet to the air injection system, may be adjusted to a further open position to maintain the desired airflow to the engine as the air injection system flow control valve is opened. As an example, the throttle position may be adjusted based on the (current) airflow to the engine compared with the desired airflow to the engine via a feedback loop, such as by adjusting the throttle valve to a further open position in response to the airflow to the engine being less than the desired airflow to the engine and adjusting the throttle valve to a further closed position in response to the airflow to the engine being greater than the desired airflow to the engine. For example, as an increased amount of air is directed toward the air injection system, the position of the throttle may be further opened in order to maintain the airflow to the engine.

Further, as one example, the controller may actuate the air injection system flow control valve to a fully open position to maximize airflow into the air injection system. In other examples, the controller may actuate the air injection system flow control valve to an open position that is selected based on a desired flow rate and/or pressure of air in the air injection system. For example, as the desired flow rate and/or pressure increases, the air injection system flow control valve may be further opened, and as the desired flow rate and/or pressure decreases, the air injection system flow control valve may be opened to a smaller degree. In some examples, the controller may further account for current pressure and flow characteristics of the engine system when selecting the open position. As one example, the controller may input MAF, the throttle inlet pressure, an exhaust pressure, and the desired flow rate and/or pressure of air in the air injection system into one or more look-up tables, maps, or algorithms, which may output the corresponding position for the air injection system flow control valve to produce the desired flow rate and/or pressure. As another example, the controller may make a logical determination (e.g., regarding the position of the air injection system flow control valve) based on logic rules that are a function of the throttle inlet pressure. The controller may then generate a control signal that is sent to the air injection system flow control valve to adjust the air injection system flow control valve to the desired position.

At 310, method 300 includes operating the electrically assisted turbocharger to increase the airflow and heat supplied to the catalyst and the GPF. As described above with respect to FIG. 1, the electrically assisted turbocharger may include a compressor coupled in the engine intake (e.g., compressor 115) that is driven by a turbine coupled in the exhaust passage upstream of the catalyst and the GPF (e.g., turbine 111). The electrically assisted turbocharger may further include an electric motor (e.g., electric motor 122) that may be operated to provide additional torque for driving the compressor. Therefore, as one example, the method may include opening (e.g., fully opening) a wastegate actuator of the turbine and operating the electric motor to provide the desired boost pressure. Opening the wastegate actuator enables exhaust to flow through the wastegate instead of the turbine, increasing an amount of heat in the exhaust downstream of the turbine by reducing heat lost at the turbine, and actuating the electric motor compensates for reduced exhaust flow through turbine by applying positive motor torque to spin the compressor. In one example, applying the positive motor torque includes estimating a compressor speed that will provide the desired boost pressure, such as via a look-up table, map, or algorithm, and then estimating a motor speed of the electric motor (or a degree of electric assistance) that will provide the estimated compressor speed. The controller may then adjust a duty cycle commanded to the electric motor to operate the motor at the estimated motor speed. In this way, an amount of exhaust energy supplied to the catalyst and the GPF may be increased without raising the engine speed and without loss of engine performance. Further, particularly when a cold start condition is present, the controller may wait a calibrated amount of time (e.g., approximately 3 seconds) or wait until a calibrated oil pressure is reached at the electrically assisted turbocharger (e.g., approximately 30 psi) before operating the electrically assisted turbocharger in order to reduce bearing degradation.

As another example, the method may additionally or alternatively include operating the electrically assisted turbocharger to increase the boost pressure above the desired boost pressure to raise an inlet pressure of the air injection system flow control valve and drive more airflow through the air injection system. As one example, the boost pressure may be increased a predetermined amount above the desired boost pressure (e.g., 5 psi above the desired boost pressure) such that the boost pressure increase is the same for all boost pressure values. As another example, the boost pressure may be increased by a percentage of the desired boost pressure (e.g., 5% of the desired boost pressure) such that the boost pressure increase varies based on the boost pressure value. As still another example, the boost pressure may be increased to a single predetermined boost pressure value regardless of the desired boost pressure. The electric motor may be operated to increase the compressor speed to provide the higher boost pressure, such as by estimating a compressor speed that will provide the increased boost pressure (e.g., via a look-up table, map, or algorithm) and then estimating a motor speed that will provide the estimated compressor speed (e.g., via a look-up table, map, or algorithm), as described above. Additionally, the throttle valve may be further adjusted to compensate for the increased boost pressure provided by the electrically assisted turbocharger. For example, the throttle valve may be further closed as the boost pressure increases above the desired boost pressure in order to maintain the desired airflow to the engine for combustion. However, in examples where the engine system does not include an electrically assisted turbocharger, 310 may be omitted and method 300 may instead continue directly from 308 to 312.

At 312, method 300 includes estimating a total airflow into the air injection system based on the air injection system flow control valve position and the throttle inlet pressure (TIP). As one example, the controller may input the air injection system flow control valve position and the throttle inlet pressure into a look-up table, algorithm, or function, which may output the estimated total airflow into the air injection system. As another example, the controller may estimate the total airflow into the air injection system based on an output of a pressure transducer in the air accumulator. For example, the controller may make a logical determination (e.g., regarding the position of total airflow into the air injection system) based on logic rules that are a function of the output of the pressure transducer.

At 314, method 300 includes determining if the air pressure of the air accumulator is greater than a threshold pressure. The threshold pressure may be a predetermined, non-zero pressure that ensures sufficient air is available for delivery to the catalyst and/or the GPF. As one non-limiting example, the threshold pressure may be approximately 30 psi. If the air pressure of the air accumulator is not greater than the threshold pressure, method 300 proceeds to 316 and includes maintaining the catalyst flow control valve and the GPF flow control valve closed. Thus, air may not be provided to the catalyst and the GPF via the air injection system while the air accumulator is refilled. As one example, the exhaust pressure may be higher than the pressure in the air injection system when the air pressure of the air accumulator is not greater than the threshold pressure, causing exhaust to flow into the air injection system if the catalyst flow control valve and the GPF flow control valve were opened.

If the air pressure of the air accumulator is greater than the threshold pressure, method 300 proceeds to 318 and includes opening the catalyst flow control valve and/or the GPF flow control valve. As one example, when the emission control device heating condition includes a cold start condition, both of the catalyst flow control valve and the GPF flow control valve may be opened to provide additional airflow to each of the catalyst and the GPF. As another example, only the catalyst flow control valve may be opened, as airflow through the catalyst may flow downstream to the GPF, and the GPF flow control valve may be maintained closed. As still another example, when one of the catalyst and the GPF is at or above its corresponding desired operating temperature, the corresponding flow control valve may be maintained closed (e.g., fully closed). For example, when the emission control device heating condition includes a GPF regeneration condition and the catalyst is above its light-off temperature, only the GPF flow control valve may be opened, preventing excess oxygen delivery to the catalyst via the air injection system by maintaining the catalyst flow control valve closed. In this way, a desired oxygen loading of the catalyst may be maintained and an occurrence of oxygen break-through may be reduced.

Further, in examples where the air injection system does not include the air accumulator, method 300 may proceed from 312 directly to 318. As an example, the catalyst flow control valve and/or the GPF flow control valve may be opened after a threshold duration has elapsed after the air injection system flow control valve is opened. As one example, the threshold duration may be a non-zero time duration that enables a desired amount of pressure to build up in the air injection system before opening the catalyst flow control valve and/or the GPF flow control valve. For example, the controller may input the air injection system flow control valve position and the throttle inlet pressure into a look-up table or algorithm, which may output the threshold duration.

The method at 318 includes adjusting the catalyst flow control valve position based on the total airflow through the air injection system and the temperature of the catalyst, as indicated at 320, and includes adjusting the GPF flow control valve position based on the total airflow through the air injection system and the temperature of the GPF, as indicated at 322. Thus, the catalyst flow control valve and the GPF flow control valve may be adjusted (including maintained closed or adjusted closed) independently using different feedback signals (e.g., the temperature of the catalyst and the temperature of the GPF, respectively). As one example, as a difference between the temperature of the catalyst and the desired operating temperature of the catalyst increases (e.g., the temperature of the catalyst is further below the desired operating temperature of the catalyst), the catalyst flow control valve may be adjusted to a further open position, and as the difference between the temperature of the catalyst and the desired operating temperature of the catalyst decreases, the catalyst flow control valve may be adjusted to a less open position. Similarly, as a difference between the temperature of the GPF and the desired operating temperature of the GPF increases (e.g., the temperature of the GPF is further below the desired operating temperature of the GPF), the GPF flow control valve may be adjusted to a further open position, and as the difference between the temperature of the GPF and the desired operating temperature of the GPF decreases, the GPF flow control valve may be adjusted to a less open position.

In some examples where airflow is provided to each of the catalyst and the GPF via the air injection system, one of the catalyst and the GPF may reach its corresponding desired operating temperature before the other. As one example, the catalyst may reach its light-off temperature while the GPF remains below its light off temperature, or vice versa. In such an example, the flow control valve corresponding to the emission control device at or above its desired operating temperature may be closed while the flow control valve corresponding to the emission control device below its desired operating temperature may be kept open. Thus, adjusting the catalyst flow control valve position based on the total airflow through the air injection system and the temperature of the catalyst at 320 may include fully closing the catalyst flow control valve in response to the catalyst reaching its desired operating temperature, and adjusting the GPF flow control valve position based on the total airflow through the air injection system and the temperature of the GPF at 322 may include fully closing the GPF flow control valve in response to the GPF reaching its desired operating temperature, at least in one example. However, in other examples, such as when the GPF regeneration condition is present, the GPF flow control valve may be maintained at least partially open in response to the GPF reaching its desired operating temperature so that additional airflow may be provided for soot oxidation. As an example, the GPF flow control valve may be maintained open at a position selected to achieve a desired airflow to the GPF for GPF regeneration.

At 324, method 300 includes adjusting engine fueling to achieve a desired air-fuel ratio (AFR) for the emission control device heating condition. For example, the engine may be a spark-ignition engine at least partially fueled with gasoline, which may be nominally operated with an AFR at or near stoichiometry (e.g., at which the air-fuel mixture produces a complete combustion reaction). During a cold start, the engine may be operated with a rich AFR, during which more fuel is provided than for producing a complete combustion reaction. However, due to the additional airflow provided by the air injection system, the AFR may be further enriched over the cold start enrichment to maintain a desired AFR, and thus the desired oxygen loading, at the catalyst. As one example, the controller may further enrich the engine fueling by approximately 5% (e.g., the desired AFR may be 5% richer than the traditional cold start enrichment) when the emission control device heating condition includes a cold start condition. As such, the engine may produce exhaust gas with a rich AFR, but the mixture of the rich exhaust gas from the engine may be enleaned by the intake air from the air injection system to produce stoichiometric mixture. The rich exhaust gas, containing unburned fuel, mixes with the (lean) intake air from the secondary injection system upstream of the catalyst and/or the GPF to generate an exotherm upstream of the catalyst and/or the GPF. For example, when intake airflow is provided to both the catalyst and the GPF via the air injection system, the rich exhaust gas from the engine is enleaned by the airflow from the air injection system upstream of the catalyst to create an exotherm at the catalyst, thereby increasing the temperature of the catalyst, and enleaned again upstream of the GPF (and downstream of the catalyst) to create another exotherm at a face of the GPF, thereby increasing the temperature of the GPF.

As another example, the desired AFR may be a rich AFR when the emission control device heating condition includes a regeneration condition. For example, the controller may set the desired AFR to be approximately 5% rich. Thus, the controller may update an AFR setpoint to the desired AFR for the particular emission control device heating condition. Further, if the enriched fueling during the GPF regeneration cools the catalyst, the controller may retard spark timing to increase an amount of heat in the exhaust gas and/or provide some intake air via the air injection system to maintain the temperature of the catalyst above its light-off temperature. As an example, an amount (or flow rate) of intake air provided to the catalyst during the GPF regeneration may be smaller than the amount (or flow rate) provided during catalyst heating (e.g., for a cold start or catalyst regeneration), with the catalyst flow control valve opened to a smaller degree.

As one example, adjusting engine fueling to achieve the desired AFR may include determining a fuel injection amount based on the cylinder air amount (as determined above at 302) and the desired AFR and sending a signal to fuel injectors of the engine with a pulse width corresponding to the fuel injection amount. For example, the controller may calculate the fuel injection amount by dividing the cylinder air amount by the desired AFR. Further, the controller may use feedback from an exhaust gas sensor (e.g., exhaust gas sensor 126 shown in FIG. 1) to further adjust the engine fueling to achieve the desired AFR.

At 326, method 300 includes determining whether the emission control device heating condition remains present. As one example, the emission control device heating condition remains present when one or both of the catalyst and the GPF remains below its desired operating temperature. As another example, additionally or alternatively, the emission control device heating condition remains present when the regeneration condition remains present, such as when the soot load of the GPF remains above a second, lower threshold soot load indicative of a regenerated GPF. If the emission control device heating condition remains present, method 300 proceeds to 328 and includes continuing providing additional airflow to the catalyst and/or the GPF via the air injection system. For example, the catalyst flow control valve may continue to be adjusted based on the temperature of the catalyst, and the GPF flow control valve may continue to be adjusted based on the temperature of the GPF. The engine may continue to be operated with adjusted fueling for the particular emission control device heating condition (e.g., cold start or regeneration), and the electric motor of the electrically assisted turbocharger may continue to compensate for the open wastegate and to provide additional boost, at least in some examples. Method 300 may return to 326 to continue assessing whether the emission control device heating condition remains present.

If the emission control device heating condition is no longer present, method 300 proceeds to 330 and includes fully closing the air injection system flow control valve, the catalyst flow control valve, and the GPF flow control valve. For example, the controller may send a control signal to each of the air injection system flow control valve, the catalyst flow control valve, and the GPF flow control valve to command the corresponding valve to a fully closed position. Alternatively, if one of the catalyst flow control valve and the GPF flow control valve is already fully closed, it may be maintained fully closed. In this way, additional airflow will not be provided to the catalyst and/or the GPF via the air injection system. Further, the throttle position may be simultaneously adjusted to maintain the desired airflow to the engine. As an example, as the air injection system flow control valve is closed, the throttle valve may be adjusted to a further closed position, as airflow is no longer being diverted from the intake passage to the air injection system.

At 332, method 300 includes operating the electrically assisted turbocharger to provide the desired boost pressure. As one example, the wastegate valve may be adjusted to a position that enables the turbine to spin the compressor at the estimated speed for providing the desired boost pressure, and the electric motor may be disabled. As another example, the electric motor may be operated to provide electric assistance if the exhaust flow through the turbine is insufficient to spin the compressor at the estimated speed (e.g., even with the wastegate valve fully closed), as described above with respect to FIG. 1.

At 334, method 300 includes adjusting the engine fueling to achieve a desired AFR for a non-heating condition. For example, the desired AFR may be at or near stoichiometry, as described above. The controller may update the AFR setpoint to the desired AFR for the non-heating condition upon exiting the heating condition, for example. The controller may then determine an adjusted fuel injection amount based on the cylinder air amount (as determined above at 302) and the updated AFR setpoint and send a signal to fuel injectors of the engine with a pulse width corresponding to the fuel injection amount. Following 334, method 300 ends.

In this way, the secondary air injection system may be coordinated with engine actuators (e.g., the throttle valve, the electrically assisted turbocharger, and engine fueling) to provide additional airflow to the catalyst and the GPF for expedited heating during both cold start and regeneration conditions without degrading engine performance. Further, each valve of the air injection system may be operated independently to provide targeted heating and achieve desired operating temperatures. In further examples, the controller may pre-fill the air accumulator when an emission control device condition is not present so that the air accumulator is ready to provide additional airflow to the exhaust passage. For example, the controller may opportunistically execute parts of method 300 to flow air to the air accumulator without flowing air to the catalyst and the GPF, such as by omitting portions that include emission control device heating (e.g., 304, 318-328, and 334).

As illustrated by examples herein, the method of operating and performing actions responsive to a determination of an emission control device heating condition may include operating in that condition (e.g., operating with the engine combusting and with a temperature of the emission control device less than a desired temperature), determining whether that condition is present (such as based on sensor output, e.g., determining that the emission control device heating condition is present based on the temperature of the emission control device being less than the desired temperature), and performing actions in response thereto, as well as operating without that condition present, determining that the condition is not present, and performing a different action in response thereto. For example, responsive to a determination that the emission control device heating condition is present, the method may include providing intake air to the engine and to the emission control device by operating in a first mode (e.g., an emission control device heating mode); and responsive to a determination that the emission control device heating condition is not present (e.g., a non-heating condition is present), the method may include providing intake air to the engine only by operating in a second mode (e.g., a non-emission control device heating mode). Further, instructions stored in memory may include determining that the emission control device heating condition is present from one or more of an engine coolant temperature sensor and an exhaust temperature sensor coupled upstream of the emission control device, and in response, providing intake air to the engine and to the emission control device by instructions for sending signals to a plurality of flow control valves in a secondary air injection system, a throttle valve, an electric motor of a turbocharger, and a wastegate valve of a turbocharger. Instructions stored in memory may also include determining that the emission control device heating condition is not present from one or more of the engine coolant temperature sensor and the exhaust temperature sensor, and in response, providing intake air to the engine only by instructions for sending a different set of signals to the throttle valve, the electric motor of the turbocharger, and the wastegate valve of the turbocharger. In some examples, the method may include determining whether to perform one or more of each of providing intake air to the engine and providing intake air to the emission control device based on a determination of whether the heating condition is present and a determination of whether the non-heating condition is present. Next, FIG. 4 shows an example timeline 400 for adjusting operation of an engine system that includes a secondary air injection system (e.g., air injection system 70 of FIG. 1) to expedite heating of a catalyst and a GPF positioned downstream of the catalyst in an exhaust passage during both a cold start condition and a GPF regeneration condition. For example, a controller (e.g., controller 12 of FIGS. 1 and 2) may perform the adjustments according to the method of FIG. 3. Engine speed is shown in plot 402, throttle position (TP) is shown in plot 404, a temperature of the catalyst (Teat) is shown in plot 406, a temperature of the GPF (TGPF) is shown in plot 408, GPF soot load (e.g., a particulate matter load of the GPF) is shown in plot 410, an AFR setpoint is shown in plot 412, an air injection system flow control valve position is shown in plot 414, a catalyst flow control valve position is shown in plot 416, a GPF flow control valve position is shown in plot 418, a wastegate (WG) valve position is shown in plot 420, and an activation status of an electrically assisted turbocharger (e-turbo) electric motor is shown in plot 422.

For all of the above, the horizontal axis represents time, with time increasing along the horizontal axis from left to right. The vertical axis represents each labeled parameter. For plots 402, 406, 408, and 410, the labeled parameter increases along the vertical axis from top to bottom. For plot 404, the vertical axis shows the throttle position from fully closed ("closed") to fully open ("open"), as labeled. For plot 412, the vertical axis represents the AFR setpoint with respect to stoichiometry, shown as a dashed line 434, with lean AFRs corresponding to AFRs that are greater than stoichiometry (e.g., vertically above dashed line 434) and rich AFRs corresponding to AFRs that are less than stoichiometry (e.g., vertically below dashed line 434). For plots 414, 416, 418, and 420, the vertical axis shows the position of the corresponding valve from fully closed ("closed") to fully open ("open"), as labeled. For plot 422, the vertical axis shows the activation status of the e-turbo electric motor as "on" (in which the electric motor is operated to provide torque for spinning the turbocharger) or "off" (in which the electric motor is deactivated and does not provide torque for spinning the turbocharger).

At time t1, the engine is started. The temperature of the catalyst (plot 406) is less than a light-off temperature of the catalyst that is represented by a dashed line 424, and the temperature of the GPF (plot 408) is less than a light-off temperature of the GPF that is represented by a dashed line 426. As a result, the controller determines that a cold start condition is present and further determines that an emission control device heating condition is present. In response, at time t2, the air injection system flow control valve (e.g., air injection system flow control valve 72 of FIG. 1) is fully opened so that intake air may flow from an intake passage of the engine, upstream of a throttle valve, into the air injection system. Simultaneously, the throttle position is adjusted to a further open position (plot 404) to compensate for the intake airflow to the air injection system. The wastegate valve is already fully open at time t2, as shown by plot 420, and is maintained open in response to the emission control device heating condition. Further, in response to the cold start condition, the controller adjusts the AFR setpoint to a rich AFR (plot 412).

Once the air injection flow control valve is opened at time t2, intake air flows into the air injection system and begins to fill an air accumulator (e.g., air accumulator 76 of FIG. 1). The air pressure of the accumulator (not shown) has not yet reached a threshold pressure for providing the intake air to the catalyst and the GPF, and so the catalyst flow control valve (e.g., first flow control valve 82 of FIG. 1), positioned to block or enable flow from the air injection system to an inlet of the catalyst, and the GPF flow control valve (e.g., second flow control valve 86 of FIG. 1), positioned to block or enable flow from the air injection system to an inlet of the GPF, remain closed (plots 416 and 418, respectively). Further, the e-turbo is not yet operated to increase airflow and heat to the catalyst and the GPF in order to reduce e-turbo bearing degradation.

At time t3, a calibrated duration elapses for reaching a desired oil pressure at the e-turbo bearings, and so the e-turbo electric motor is activated to increase a provided boost pressure above a desired boost pressure for engine operation (not shown). In response, the throttle valve is adjusted to a further closed position in order to maintain a desired airflow to the engine.

At time t4, the air pressure of the accumulator (not shown) reaches the threshold pressure for providing the intake air to the catalyst and the GPF. In response, the catalyst flow control valve (plot 416) and the GPF flow control valve (plot 418) are both commanded open, enabling airflow from the air injection system to the inlet of the catalyst (e.g., via the open catalyst flow control valve) and the inlet of the GPF (e.g., via the open GPF flow control valve). In the example of timeline 400, the catalyst flow control valve and the GPF flow control valve are both commanded fully open at time t4. Further, due to the additional airflow to the catalyst and the GPF, the AFR setpoint is further enriched (plot 412).

Between time t4 and time t5, a driver tip-in event occurs, resulting in a further opening of the throttle position (plot 404) and an increase in the engine speed (plot 402). Despite the increased driver demand, the wastegate valve remains fully open (plot 420) so that hot exhaust bypasses a turbine of the e-turbo and is delivered to the catalyst, with the e-turbo electric motor providing torque to spin the turbocharger instead of the turbine. Further, the soot load of the GPF (plot 410) increases as the engine is operated in the cold start condition. The temperature of the catalyst (plot 406) and the temperature of the GPF (plot 408) both increase, and each increases at a faster rate than if the secondary air injection, the additional enrichment, and the e-turbo were not used, indicated by dashed segments 407 and 409, respectively. The catalyst flow control valve position (plot 416) is adjusted based in part on the temperature of the catalyst (plot 406) such that a degree of opening of the catalyst flow control valve decreases as the temperature of the catalyst increases toward its light-off temperature (dashed line 424). Similarly, the GPF flow control valve position (plot 418) is adjusted based in part on the temperature of the GPF (plot 408) such that a degree of opening of the GPF flow control valve decreases as the temperature of the GPF increases towards its light-off temperature (dashed line 426).

At time t5, the temperature of the catalyst (plot 406) reaches the light-off temperature of the catalyst (dashed line 424). In response, the catalyst flow control valve is fully closed (plot 416) so that additional airflow is no longer provided to the inlet of the catalyst. However, the air injection flow control valve (plot 414) and the GPF flow control valve (plot 418) remain open so that heating continues at the GPF, which has not yet reached its light-off temperature. Further, the wastegate valve is maintained open (plot 420) and the e-turbo continues to be operated with electrical assistance from the electric motor (plot 422).

At time t6, the temperature of the GPF (plot 408) reaches the light-off temperature of the GPF (dashed line 426). In response, the GPF flow control valve is fully closed (plot 418) so that additional airflow is no longer provided to the inlet of the GPF. Further, the air injection system flow control valve is fully closed (plot 414) so that intake air no longer flows into the air injection system, and the e-turbo electric motor is deactivated (plot 422). Simultaneously, the wastegate valve is adjusted to a position that enables the turbine to meet the desired boost pressure for engine operation (not shown). Because the e-turbo is no longer operated to provide a boost pressure that is above the desired boost pressure, the throttle valve is adjusted to a further open position (plot 404) in order to maintain a desired airflow to the engine. Further, because the cold start condition is no longer present with the catalyst and GPF having reached their respective light-off temperatures, the AFR setpoint is adjusted to stoichiometry (plot 434). The GPF soot load continued to increase as the engine is operated (plot 410).

At a later time t7 (e.g., after a period of time passes while the engine is operated), the soot load of the GPF (plot 410) reaches an upper threshold soot load represented by a dashed line 430. As a result, regeneration of the GPF is indicated. However, the temperature of the GPF (plot 408) is below a regeneration temperature threshold shown by a dashed line 428. Therefore, the air injection system flow control valve is opened (plot 414) to enable intake air to flow into the air injection system. At the same time, the throttle valve is adjusted to a further open position (plot 404) to compensate for the airflow diverted to the air injection system. Further, the wastegate valve is fully opened (plot 420) and e-turbo electric motor is operated for electrical assistance (plot 422). In the example at time t7, operation of the e-turbo does not increase the boost pressure above the desired boost pressure (not shown), but enables the wastegate valve to be opened without a boost deficit occurring.

Responsive to the air pressure of the accumulator (not shown) reaching the threshold pressure at time t8, the GPF flow control valve is opened (plot 418) to provide intake airflow to the inlet of the GPF while the catalyst flow control valve (plot 416) remains closed to prevent intake airflow to the inlet of the catalyst. Further, the AFR setpoint is adjusted to a rich AFR (plot 412), the rich AFR being less rich than during the cold start (e.g., between time t2 and time t6). The GPF flow control valve position (plot 418) is against adjusted based in part on the temperature of the GPF (plot 408), and at time t9, the temperature of the GPF reaches the regeneration temperature threshold (dashed line 428). Because the GPF has not yet been regenerated (e.g., the emission control device heating condition remains present), the GPF flow control valve (plot 418) and the air injection system flow control valve (plot 414) are maintained open to provide additional airflow for oxidizing soot at the GPF. The temperature of the catalyst (plot 406) decreases due to the enriched fueling, but remains above the light-off temperature of the catalyst (dashed line 424). Thus, the catalyst flow control valve remains closed (plot 416). With the temperature of the GPF (plot 408) above the regeneration temperature threshold (dashed line 428), the GPF soot load (plot 410) decreases as soot deposits are burned from the GPF, and at time t10, the GPF soot load reaches a lower threshold soot load represented by a dashed line 432, indicating that the GPF regeneration is complete. In contrast, if the additional airflow had not been provided to the GPF inlet by the air injection system and the additional heat supplied by operating the e-turbo with the wastegate valve open, the GPF soot load would have decreased more slowly, as indicated by a dashed plot 411. In response to the GPF soot load (plot 410) reaching the lower threshold soot load (dashed line 432), the GPF flow control valve (plot 418) and the air injection system flow control valve (plot 414) are fully closed. Simultaneously, the throttle valve is returned to a further closed position (plot 404), as a portion of intake airflow is no longer provided to the air injection system. The wastegate valve is returned to a closed position (plot 420), enabling the turbine to provide enough torque to operate the e-turbo to provide the desired boost pressure, and the e-turbo electric motor is deactivated (plot 422). Further, the AFR setpoint is returned to stoichiometry (plot 412). With the engine no longer operating in an emission control device heating condition, the throttle position and the wastegate valve position will be adjusted based on driver demand.

In this way, efficient emission control device heating is provided via an air injection system that leverages an electrically assisted turbocharger and an air accumulator. The heating may be directed at one or more emission control devices, such as a catalyst coupled upstream of a particulate filter, by separately controlling flow control valves coupled upstream of each emission control device based on a heating demand of the corresponding emission control device. For example, the air injection system may be used to provide fresh air upstream of the catalyst and upstream of the GPF in response to a cold start condition. As another example, the air injection system may be used to provide fresh air upstream of the GPF only, and not upstream of the catalyst, in response to a GPF regeneration condition, thereby reducing disruption of an oxygen loading at the catalyst. By leveraging the electrically assisted turbocharger, the emission control device(s) may be heated with a turbine wastegate fully open, thereby directing exhaust heat to the emission control device(s) and not the turbine, for expedited heating without degraded engine performance. By including the air accumulator, air may be available for delivery at the one or more emission control devices more quickly during a cold start without impacting engine performance. Overall, vehicle emissions may be reduced by quickly raising the temperature of the emission control device(s) during a cold start and efficiently regenerating the emission control device (s) during engine operation.

The technical effect of supplying intake airflow to an emission control device via an air injection system while relying on electric assistance to a turbocharger compressor to maintain boost pressure is that a temperature of the emission control device may be quickly increased without a decrease in engine performance.

As one example, a method comprises: responsive to a heating condition, flowing air from an intake of an engine to one or more emission control devices via an air injection system while operating a turbocharger via an electric motor to maintain a demanded airflow to the engine for producing engine torque. In the preceding example, additionally or optionally, the one or more emission control devices are coupled in an exhaust passage of the engine, the air injection system couples the intake from upstream of a throttle valve to the exhaust passage upstream of the one or more emission control devices, and the air injection system includes a check valve that enables flow from the intake to the exhaust passage and blocks flow from the exhaust passage to the intake. In one or both of the preceding examples, additionally or optionally, the turbocharger includes a compressor positioned in the intake, an electric motor, and a turbine positioned in the exhaust passage upstream of the one or more emission control devices, and operating the turbocharger to maintain the demanded airflow to the engine includes fully opening a wastegate of the turbine while spinning the compressor via the electric motor. In any or all of the preceding examples, additionally or optionally, operating the turbocharger via the electric motor to maintain the demanded airflow to the engine includes spinning a compressor of the turbocharger via the electric motor at a speed that is greater than for providing the demanded airflow, and the method further comprises adjusting the throttle valve to a further closed position to maintain the demanded airflow to the engine. In any or all of the preceding examples, additionally or optionally, the air injection system further includes a first flow control valve coupled upstream of the check valve, the first flow control valve positioned to enable or block flow from the intake to the air injection system, and flowing air from the intake to the one or more emission control devices includes opening the first flow control valve. In any or all of the preceding examples, additionally or optionally, the air injection system further includes a second flow control valve coupled downstream of the check valve, the second flow control valve positioned to enable or block flow from the air injection system to the exhaust passage upstream of the one or more emission control devices, and flowing air from the intake to the one or more emission control devices further includes opening the second flow control valve. In any or all of the preceding examples, additionally or optionally, the one or more emission control devices include a three-way catalyst and a gasoline particulate filter, the gasoline particulate filter coupled downstream of the three-way catalyst in the exhaust passage; the second flow control valve is positioned to enable or block flow from the air injection system to the exhaust passage upstream of the three-way catalyst; the air injection system further includes a third flow control valve coupled downstream of the check valve and in parallel with the second flow control valve, the third flow control valve positioned to enable or block flow from the air injection system to the exhaust passage upstream of the gasoline particulate filter and downstream of the three-way catalyst; and flowing air from the intake to the one or more emission control devices further includes opening the third flow control valve. In any or all of the preceding examples, additionally or optionally, opening the first flow control valve includes adjusting the first flow control valve to an open position selected based on a desired pressure in the air injection system; opening the second flow control valve includes adjusting the second flow control valve to an open position selected based on a temperature of the three-way catalyst, the open position of the first flow control valve, and a pressure at an inlet of the throttle valve; and opening the third flow control valve includes adjusting the third control valve to an open position selected based on a temperature of the gasoline particulate filter, the open position of the first flow control valve, and the pressure at the inlet of the throttle valve. In any or all of the preceding examples, the method additionally or optionally further comprises, responsive to the heating condition not being present, blocking air flow from the air injection system to the one or more emission control devices by fully closing or maintaining closed each of the first flow control valve, the second flow control valve, and the third flow control valve. In any or all of the preceding examples, additionally or optionally, the air injection system further includes an air accumulator coupled downstream of the check valve and upstream of each of the second flow control valve and the third flow control valve, and opening the second flow control valve and opening the third flow control valve is further responsive to an air pressure in the air accumulator being greater than or equal to a threshold pressure. In any or all of the preceding examples, additionally or optionally, the heating condition is one of an engine cold start condition and an emission control device regeneration condition.

As another example, a method comprises: responsive to a first condition, adjusting a first flow control valve to a first open position and a second flow control valve to a second open position, the first flow control valve and the second flow control valve coupled in series and configured to block or enable air flow from an engine intake to an engine exhaust passage upstream of a first emission control device; and responsive to a second condition, fully closing or maintaining closed the first flow control valve and the second flow control valve. In the preceding example, the method additionally or optionally further comprises responsive to the first condition, adjusting a third flow control valve to a third open position, the third flow control valve coupled in series with the first flow control valve and coupled in parallel with the second flow control valve and configured to block or enable air flow from the engine intake to the engine exhaust passage upstream of a second emission control device; and responsive to the second condition, fully closing or maintaining closed the third flow control valve. In one or both of the preceding examples, additionally or optionally, the first position is selected at least partially based on a pressure in the engine intake; the second position is selected based on the first position, the pressure in the engine intake, and a temperature of the first emission control device; and the third position is selected based on the first position, the pressure in the engine intake, and a temperature of the second emission control device. In any or all of the preceding examples, the method additionally or optionally further comprises, during the first condition, operating a turbocharger using electric assistance with a wastegate valve fully open, the electric assistance adjusted based on engine torque demand, and enriching engine fueling; and during the second condition, operating the turbocharger with the wastegate adjusted to a position selected based on the engine torque demand. In any or all of the preceding examples, additionally or optionally, the first condition includes at least one of an engine temperature less than a threshold temperature and a load of the first emission control device greater than an upper threshold load, and the second condition includes both of the engine temperature greater than the threshold temperature and the load of the first emission control device less than a lower threshold load.

As another example, a vehicle system comprises: an engine; a turbocharger including an intake compressor rotationally coupled to an exhaust turbine via a shaft and an electric motor; a wastegate valve coupled in a bypass around the exhaust turbine; exhaust passage including a catalyst and a particulate filter, the catalyst coupled upstream of the particulate filter and downstream of the exhaust turbine; an air injection system for flowing intake air from an intake passage of the engine, downstream of the intake compressor, into the exhaust passage, upstream of each of the catalyst and the particulate filter, the air injection system including a plurality of flow control valves; and a controller storing executable instructions in non-transitory memory that, when executed, cause the controller to: operate in a first mode to provide intake air to the engine and at least one of the catalyst and the particulate filter, where operating in the first mode includes operating the turbocharger via the electric motor with the wastegate valve fully open, adjusting the plurality of flow control valves, and operating the engine with a rich air-fuel ratio; and operate in a second mode to provide intake air to the engine only, where operating in the second mode includes operating the turbocharger with the wastegate valve at a position selected based on engine demand and fully closing the plurality of flow control valves. In the preceding example, additionally or optionally, the plurality of flow control valves includes a first flow control valve coupled at an inlet of the air injection system, a second flow control valve coupled at a first outlet of the air injection system, the first outlet coupled to the exhaust passage upstream of the catalyst and downstream of the exhaust turbine, and a third flow control valve coupled at a second outlet of the air injection system, the second outlet coupled to the exhaust passage upstream of the particulate filter and downstream of the catalyst and parallel to the first outlet. In one or both of the preceding examples, additionally or optionally, the air injection system further includes an air accumulator coupled downstream of the first flow control valve and upstream of each of the second flow control valve and the third flow control valve and a check valve coupled downstream of the first flow control valve and upstream of the air accumulator. In any or all of the preceding examples, the system additionally or optionally further comprises a throttle valve coupled in the intake passage downstream of the inlet of the air injection system, wherein operating in the first mode is responsive to a temperature of at least one of the catalyst and the particulate filter being less than a threshold temperature, and the controller includes further instructions stored in non-transitory memory that, when executed while operating in the first mode, cause the controller to: estimate an airflow into the air injection system based on a position of the first valve and a pressure at an inlet of the throttle valve; adjust a position of the second flow control valve based on the estimated airflow into the air injection system and a temperature of the catalyst; and adjust a position of the third flow control valve based on the estimated airflow into the air injection system and a temperature of the particulate filter.

In another representation, a method comprises: operating an engine while a temperature of an emission control device temperature is less than a threshold temperature; and responsive to the temperature of the emission control device being less than the threshold temperature, flowing air from an intake of the engine via an air injection system while operating an electrically assisted turbocharger to maintain a desired airflow to the engine and enriching fueling of the engine. In the preceding example, additionally or optionally, wherein the threshold temperature is one of a light-off temperature of the emission control device and a regeneration temperature of the emission control device. In one or both of the preceding examples, additionally or optionally, enriching fueling of the engine includes increasing an amount of fuel relative to an air charge amount, the amount of fuel selected to produce a stoichiometric air-fuel ratio downstream of the emission control device. In any or all of the preceding examples, additionally or optionally, the emission control device is coupled in an exhaust passage of the engine and the air injection system couples the intake from upstream of a throttle valve to the exhaust passage upstream of the emission control device via a conduit, and the air injection system includes a check valve positioned in the conduit to enable flow from the intake to the exhaust passage via the conduit and block flow from the exhaust passage to the intake via the conduit. In any or all of the preceding examples, additionally or optionally, the turbocharger includes a compressor positioned in the intake, an electric motor, and a turbine positioned in the exhaust passage upstream of the emission control device, and operating the turbocharger to maintain the demanded airflow to the engine includes fully opening a wastegate of the turbine while spinning the compressor via the electric motor. In any or all of the preceding examples, additionally or optionally, the air injection system further includes a first flow control valve coupled in the conduit upstream of the check valve, the first flow control valve positioned to enable flow from the intake to the air injection system when at least partially open and block flow from the intake to the air injection system when fully closed, and flowing air from the intake to the emission control device includes opening the first flow control valve. In any or all of the preceding examples, additionally or optionally, the air injection system further includes a second flow control valve coupled downstream of the check valve, the second flow control valve positioned to enable flow from the air injection system to the exhaust passage when at least partially open and block flow from the air injection system to the exhaust passage when fully closed, and flowing air from the intake to the emission control device further includes opening the second flow control valve. In any or all of the preceding examples, additionally or optionally, opening the first flow control valve includes adjusting an open position of the first flow control valve based on a desired pressure in the air injection system, and opening the second flow control valve includes adjusting an open position of the second flow control valve based on a temperature of the emission control device, the open position of the first flow control valve, and a pressure at an inlet of the throttle valve. In any or all of the preceding examples, the method additionally or optionally further comprises, responsive to the temperature of the emission control device being greater than the threshold temperature, blocking air flow from the air injection system to the emission control device by fully closing or maintaining closed the first flow control valve and the second flow control valve. In any or all of the preceding examples, additionally or optionally, wherein the air injection system further includes an air accumulator coupled in the conduit downstream of the check valve, and opening the second flow control valve is further responsive to an air pressure in the air accumulator being greater than or equal to a threshold pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
via a controller, responsive to a heating condition, flowing air from an intake of an engine to one or more emission control devices via an air injection system while operating a turbocharger via an electric motor to maintain a demanded airflow to the engine for producing engine torque, the flowing air from the intake of the engine to the one or more emission control devices including opening a first flow control valve of the air injection system to a first open position selected at least partially based on a pressure in the intake, opening a second flow control valve of the air injection system to a second open position selected based on the first open position, the pressure in the intake, and a first temperature of the one or more emission control devices, and opening a third flow control valve of the air injection system to a third open position selected based on the first open position, the pressure in the intake, and a second temperature of the one or more emission control devices.

2. The method of claim 1, wherein the one or more emission control devices are coupled in an exhaust passage of the engine, the air injection system couples the intake from upstream of a throttle valve to the exhaust passage upstream of the one or more emission control devices, and the air injection system includes a check valve that enables flow from the intake to the exhaust passage and blocks flow from the exhaust passage to the intake via the controller.

3. The method of claim 2, wherein the turbocharger includes a compressor positioned in the intake, the electric motor, and a turbine positioned in the exhaust passage upstream of the one or more emission control devices, and operating the turbocharger to maintain the demanded airflow to the engine includes fully opening a wastegate of the turbine while spinning the compressor via the electric motor via the controller.

4. The method of claim 2, wherein operating the turbocharger via the electric motor to maintain the demanded airflow to the engine includes spinning a compressor of the turbocharger via the electric motor at a speed that is greater than for providing the demanded airflow, and the method further comprises adjusting the throttle valve to a further closed position to maintain the demanded airflow to the engine.

5. The method of claim 2, wherein the first flow control valve is coupled upstream of the check valve, the first flow control valve positioned to enable or block flow from the intake to the air injection system.

6. The method of claim 5, wherein the second flow control valve is coupled downstream of the check valve, the second flow control valve positioned to enable or block flow from the air injection system to the exhaust passage upstream of the one or more emission control devices via the controller.

7. The method of claim 6, wherein:
the one or more emission control devices include a three-way catalyst and a gasoline particulate filter, the gasoline particulate filter coupled downstream of the three-way catalyst in the exhaust passage;
the second flow control valve is positioned to enable or block flow from the air injection system to the exhaust passage upstream of the three-way catalyst via the controller; and
the third flow control valve is coupled downstream of the check valve and in parallel with the second flow control valve, the third flow control valve positioned to enable or block flow from the air injection system to the exhaust passage upstream of the gasoline particulate filter and downstream of the three-way catalyst.

8. The method of claim 7, wherein:
via the controller, the first open position is further selected based on a desired pressure in the air injection system;
the first temperature of the one or more emission control devices is a temperature of the three-way catalyst;
the second open position is further selected based on a pressure at an inlet of the throttle valve;
the second temperature of the one or more emission control devices is a temperature of the gasoline particulate filter; and
the third open position is further selected based on the pressure at the inlet of the throttle valve.

9. The method of claim 7, further comprising, responsive to the heating condition not being present, blocking air flow from the air injection system to the one or more emission control devices by fully closing or maintaining closed each of the first flow control valve, the second flow control valve, and the third flow control valve via the controller.

10. The method of claim 7, wherein the air injection system further includes an air accumulator coupled downstream of the check valve and upstream of each of the second flow control valve and the third flow control valve, and opening the second flow control valve and opening the third flow control valve is further responsive to an air pressure in the air accumulator being greater than or equal to a threshold pressure via the controller.

11. The method of claim 1, wherein the heating condition is one of an engine cold start condition and an emission control device regeneration condition.

12. A method, comprising:
via a controller, controlling each of a first flow control valve, a second flow control valve, and a third flow control valve, the first flow control valve and the second flow control valve coupled in series and configured to block or enable air flow from an engine intake to an engine exhaust passage upstream of a first emission control device, the third flow control valve coupled in series with the first flow control valve and coupled in parallel with the second flow control valve and configured to block or enable air flow from the engine intake to the engine exhaust passage upstream of a second emission control device, the controlling including:
responsive to a first condition, adjusting the first flow control valve to a first open position selected at least partially based on a pressure in the engine intake, adjusting the second flow control valve to a second open position selected based on the first open position, the pressure in the engine intake, and a temperature of the first emission control device, and adjusting the third flow control valve to a third open position selected based on the first open position, the pressure in the engine intake, and a temperature of the second emission control device; and
responsive to a second condition, fully closing or maintaining closed the first flow control valve, the second flow control valve, and the third flow control valve.

13. The method of claim 12, further comprising:
via the controller, during the first condition, operating a turbocharger using electric assistance with a wastegate valve fully open, the electric assistance adjusted based on engine torque demand, and enriching engine fueling; and
during the second condition, operating the turbocharger with the wastegate adjusted to a position selected based on the engine torque demand.

14. The method of claim 12, via the controller, wherein the first condition includes at least one of an engine temperature less than a threshold temperature and a load of the first emission control device greater than an upper threshold load, and the second condition includes both of the engine temperature greater than the threshold temperature and the load of the first emission control device less than a lower threshold load.

15. A vehicle system, comprising:
an engine;
a turbocharger including an intake compressor rotationally coupled to an exhaust turbine via a shaft and an electric motor;
a wastegate valve coupled in a bypass around the exhaust turbine;
an exhaust passage including a catalyst and a particulate filter, the catalyst coupled upstream of the particulate filter and downstream of the exhaust turbine;
an air injection system for flowing intake air from an intake passage of the engine, downstream of the intake compressor, into the exhaust passage, upstream of each of the catalyst and the particulate filter, the air injection system including a first flow control valve coupled at an inlet of the air injection system, a second flow control valve coupled in series with the first flow control valve at a first outlet of the air injection system, the first outlet coupled to the exhaust passage upstream of the catalyst, and a third flow control valve coupled at a second outlet of the air injection system, the third flow control valve in series with the first flow control valve and in parallel with the second flow control valve, the second outlet coupled to the exhaust passage upstream of the particulate filter and downstream of the catalyst and parallel to the first outlet; and
a controller storing executable instructions in non-transitory memory that, when executed, cause the controller to:
operate in a first mode to provide the intake air to the engine and at least one of the catalyst and the particulate filter, where operating in the first mode includes operating the turbocharger via the electric motor with the wastegate valve fully open, adjusting the first flow control valve to a first open position selected at least partially based on a pressure in the intake passage, adjusting the second flow control valve to a second open position selected based on the first open position, the pressure in the intake passage, and a temperature of the catalyst, and adjusting the third flow control valve to a third open position selected based on the first open position, the pressure in the intake passage, and a temperature of the particulate filter, and operating the engine with a rich air-fuel ratio; and
operate in a second mode to provide intake air to the engine only, where operating in the second mode includes operating the turbocharger with the wastegate valve at a position selected based on engine demand and fully closing or maintaining closed the first flow control valve, the second flow control valve, and the third flow control valve.

16. The system of claim 15, wherein the air injection system further includes:
an air accumulator coupled downstream of the first flow control valve and upstream of each of the second flow control valve and the third flow control valve; and
a check valve coupled downstream of the first flow control valve and upstream of the air accumulator.

17. The system of claim 15, further comprising a throttle valve coupled in the intake passage downstream of the inlet of the air injection system, wherein operating in the first mode is responsive to a temperature of at least one of the catalyst and the particulate filter being less than a threshold temperature, and the controller includes further instructions stored in non-transitory memory that, when executed while operating in the first mode, cause the controller to:
estimate an airflow into the air injection system based on the first open position and a pressure at an inlet of the throttle valve.

* * * * *